Feb. 17, 1959 G. L. BEERS 2,874,213

MULTIPLEX TRANSMISSION

Filed June 29, 1954 3 Sheets-Sheet 1

INVENTOR.
GEORGE L. BEERS
BY
Otis A. Mitchell
ATTORNEY

INVENTOR.
GEORGE L. BEERS
BY
[signature]
ATTORNEY

United States Patent Office 2,874,213

Patented Feb. 17, 1959

2,874,213

MULTIPLEX TRANSMISSION

George L. Beers, Haddonfield, N. J., assignor to Radio Corporation of America, a corporation of Delaware Application June 29, 1954, Serial No. 440,233

12 Claims. (Cl. 178—5.6)

The present invention relates to multiplex transmission systems, and more particularly to transmission systems in which so-called facsimile signals are multiplexed with television signals.

There has been disclosed a high speed, wide band facsimile transmission method employing electronic scanning and other features of television systems, the term "Ultrafax" being applied to such transmission methods. The general principles of operation and typical terminal apparatus required for an Ultrafax system are discussed in some detail in an article entitled "Ultrafax" by D. S. Bond and V. J. Duke appearing in the March 1949 issue of the RCA Review. In brief, the Ultrafax system employs a flying spot kinescope to scan copy in the form of film at the sending terminal, the intensity modulated light passed by the film being converted to a video signal by a suitable photo-responsive device, such as a multiplier phototube. After suitable amplification, response correction, clamping, etc. in apparatus comparable to that employed for similar purposes in television systems, the video signals are applied to a wideband network link for conveyance to the receiving terminal. Wide band relay systems such as the well-known microwave relay circuits or coaxial transmission line circuits used in the networking of television signals are appropriate for service as the Ultrafax network links. At the receiving terminal the video signals are applied to a projection kinescope to modulate in intensity the kinescope beam. The kinescope raster is focused on the film of a recording camera, and reproductions of the original copy are thus obtained on film in the receiving terminal. The film may be applied to high speed film processing units to obtain final copies in a very short time interval.

In field tests conducted with Ultrafax apparatus of the type described, pages set up in ten-point type were sent at the rate of 480 per minute, giving an equivalent of 300,000 words per minute. Analysis indicated that perfectly legible copy could be obtained at speeds of approximately one million words per minute. The exceptionally high speed of facsimile transmission thus obtainable with an Ultrafax system as compared to the speed capabilities of the more conventional narrow band facsimile system indicate a significant utility for Ultrafax in the communication field. An economic factor however which has tended to hamper the application of Ultrafax methods to the transmission of messages and records on a wide inter-city scale is the expense of providing the wide band network links required for the transmission of the Ultrafax video signals.

The present invention is directed toward a practical system for multiplexing wide band facsimile signals with the television signals which are regularly conveyed between cities on the existing television network facilities. Thus, in accordance with the present invention, facsimile signals may be conveyed between cities on the high speed basis of an Ultrafax system without requiring the additional establishment of a facsimile network separate from presently existing television networks.

In accordance with embodiments of the present invention, facsimile signals are in effect given a "free ride" on the television network facilities by utilizing the vertical blanking intervals in the composite television signal being transmitted over the network links for the transmission of a predetermined number of "lines" of Ultrafax information in place of the synchronizing waveforms usually occupying these intervals. It is standard practice in the television field for the station receiving the network program to strip the synchronizing pulses from the composite signal received from the relay, and to replace them with "cleaner," locally generated sync pulses. The vertical blanking intervals of a relayed composite signal are thus in effect wasted for the most part, insofar as the information transmitted during such periods is not actually used. The present invention proposes a unique use for this "wasted" time by inserting facsimile information into the composite signal during the vertical blanking periods.

Since the vertical blanking period occupies approximately 5 to 8% of each $\frac{1}{60}$ of a second television field, use of at least 5% of the time assigned to the transmission of television signals over a relay link may be devoted to the transmission of facsimile information without interference with, or delay of, the television relaying operation. In view of the million word-per-minute capability ascribed to the Ultrafax system as previously noted, rates of transmission of facsimile information of the order of 50,000 words per minute over the television network facilities in accordance with the multiplexing principles of the present invention are readily conceivable.

In accordance with an embodiment of the present invention, input and output terminal apparatus are provided at the input and output ends of a television network link to permit the transmission and reception of facsimile signals via this link during its use for the transmission of television program material from station to station. The input terminal apparatus includes facsimile sending terminal apparatus and television-facsimile multiplexing apparatus for multiplexing television signals with the generated facsimile signals for combined transmission over the network link. The output terminal apparatus conversely includes television-facsimile signal separating apparatus for separating the multiplexed television and facsimile signals received via the network link, and facsimile receiving terminal apparatus responsive to the separated facsimile signal. The facsimile sending and receiving terminal apparatus may comprise apparatus of the well-known Ultrafax type, suitably controlled and synchronized with respect to the television signals being transmitted over the network link such that facsimile signal generation and reproduction is restricted to the vertical blanking intervals of the composite television signals being relayed. Apparatus is provided at the input end of the network link for separating the multiplexed television and facsimile signal, and routing the facsimile signals to the facsimile reproducer, and for regenerating synchronizing information to occupy the television signal vertical blanking intervals, whereby a complete composite television signal is again formed for appropriate utilization by the receiving television station.

Accordingly, it is a primary object of the present invention to provide a novel multiplex transmission system.

It is a further object of the present invention to provide a novel system for multiplexing television and facsimile signals.

It is an additional object of the present invention to provide a novel facsimile transmission system whereby existing television network facilities may be utilized for transmission of wide band facsimile signals simultaneously with their use for the transmission of television signals.

It is another object of the present invention to provide a novel television transmission system wherein the vertical blanking periods of a transmitted composite television signal are utilized for the transmission of facsimile information.

It is also an object of the present invention to provide an economically feasible wide band facsimile network system.

Other objects and advantages of the present invention will be readily appreciated by those skilled in the art upon a reading of the following detailed description and an inspection of the accompanying drawings in which.

Figure 1:
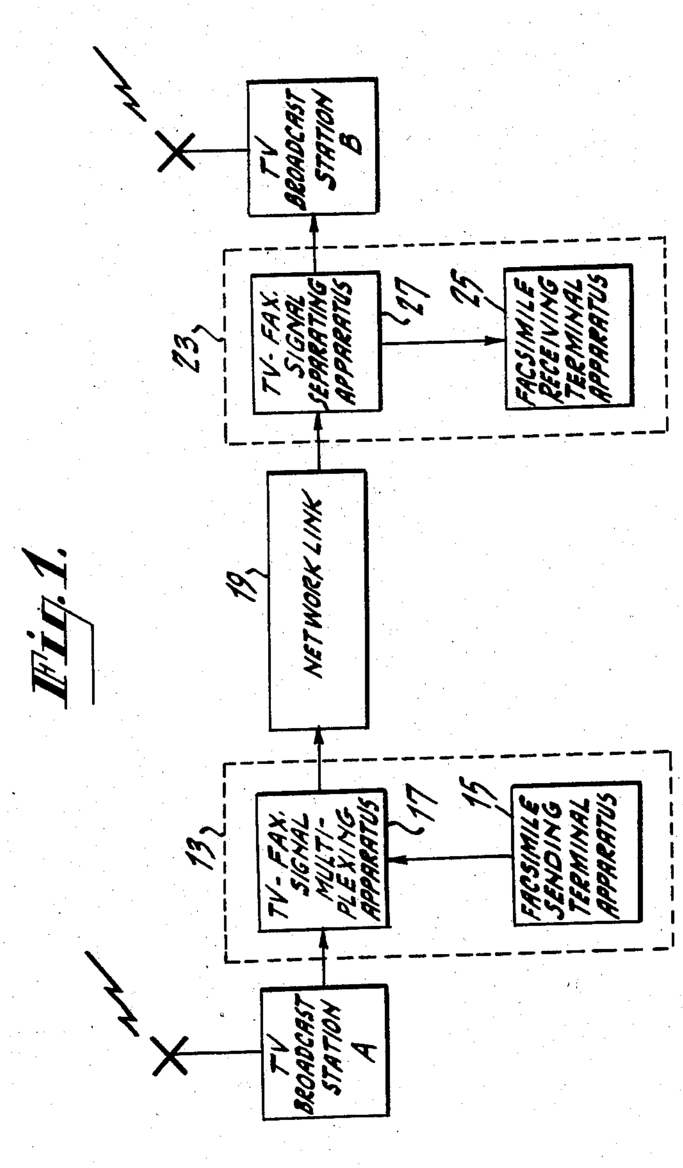
Figure 1 illustrates generally in block form a multiplexed television-facsimile network arrangement in accordance with the present invention.

Referring first to Figure 1, there is illustrated in block form apparatus embodying the principles of the present invention. A pair of television broadcast stations, station A and station B are provided with a conventional network link 19, which may comprise a microwave relay circuit or a coaxial transmission line circuit, for example. It may be assumed that a television program originating at station A is being conveyed over the network link 19 to station B, for a simultaneous broadcast thereby, or for recording or other purposes. In accordance with the invention, input and output terminal apparatus 13 and 23 are provided at the input and output ends of the network link 19 to permit the transmission and reception of facsimile signals via this link during the transmission of the program material from station A to station B. As illustrated, the input terminal apparatus 13 includes facsimile sending terminal apparatus 15, and television-facsimile multiplexing apparatus 17 for multiplexing the television signals from station A with the Ultrafax signals from source 15 for combined transmission over the network link 19. The output terminal apparatus 23 conversely includes television-facsimile signal separating apparatus 27 for separating the multiplexed television and facsimile signals received via the network link 19, and facsimile receiving terminal apparatus 25.

As previously noted, the multiplexing of television and facsimile signals is achieved with a minimum of interference with the transmission of useful television information by utilizing the vertical blanking intervals of the composite video signal being transferred. To more fully appreciate the manner in which multiplex transmission and reception of this character can be performed, reference should be made to Figures 2 and 3 wherein a more detailed presentation of representative forms of the input terminal apparatus 13 and the output terminal apparatus 23, respectively, is made.

Figure 2:
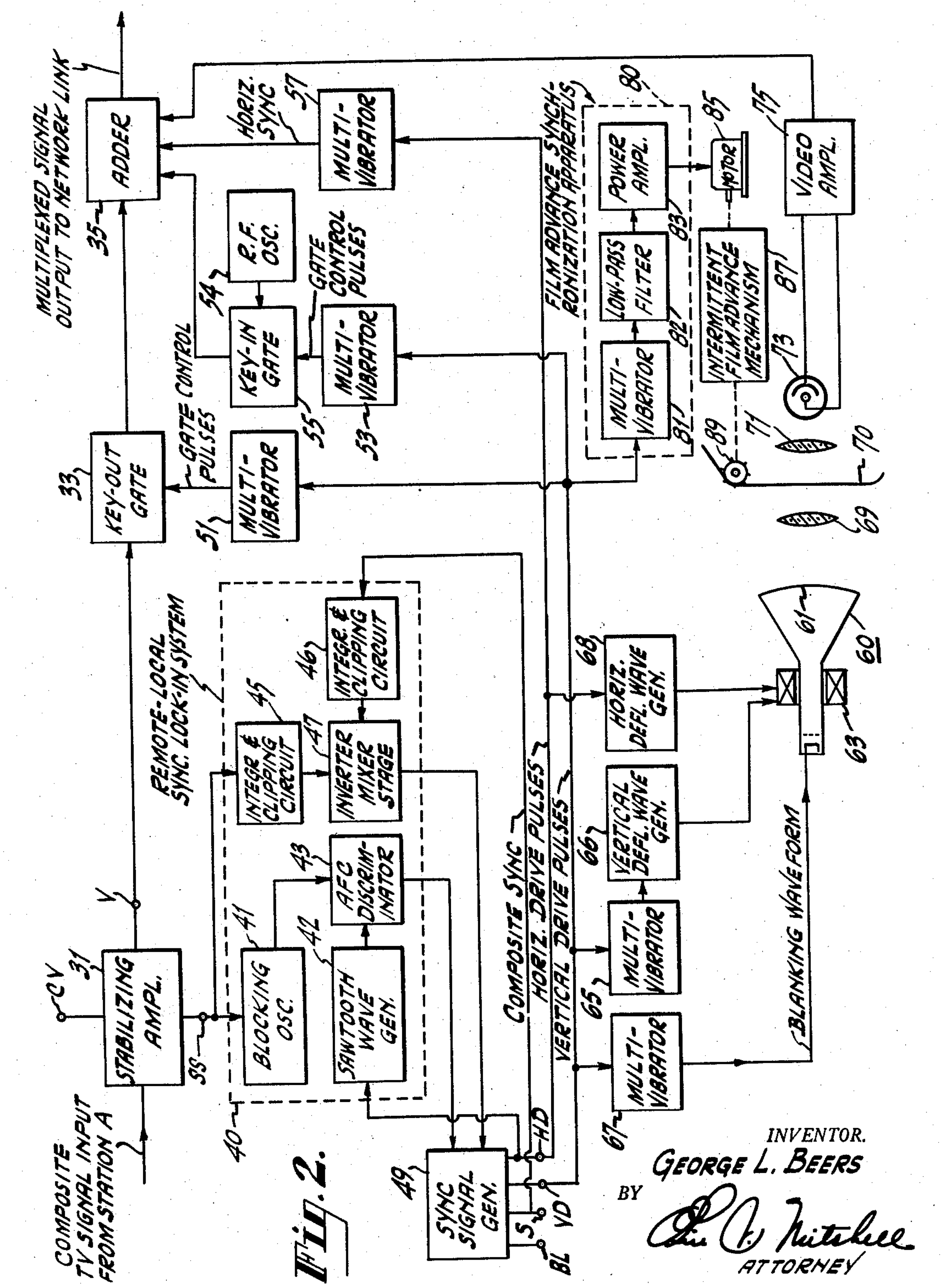
Figure 2 illustrates in block and schematic form sending terminal apparatus of a television-facsimile multiplexing system in accordance with an embodiment of the present invention.

In Figure 2 the composite video signals supplied by station A are illustrated as being applied to the input of a stabilizing amplifier 31. Stabilizing amplifiers are conventionally utilized for many purposes in television broadcast practice, such as correcting many types of faulty television signals, mixing sync with video signals from the camera, supplying a separate pulse for local sync generator "lock-in," and for removing sync from a remote signal so that it may be switched, faded or dissolved with local signals. The stabilizing amplifier 31 of the system of Figure 2, may be, for example, of the RCA TA–5C type, which is described in the RCA AM–FM Television Broadcast Equipment Catalogue (1950). In the TA–5C stabilizing amplifier, sync is separated from the input composite video signal, and after clipping and reshaping is available as a separate output signal, which may be used, for example, to phase a local sync generator with the incoming signal. A separate video signal is also obtained from the input composite signal by clipping the composite signal at blanking level. The TA–5C stabilizing amplifier is provided with a mixing amplifier stage, where the "cleaned-up" sync is added back to the video portion of the signal.

As indicated on the drawing, output terminal CV of the stabilizing amplifier 31, at which terminal the recombined, cleaned-up, composite video signal output is available, is not utilized in the multiplexing operation. However, it will be appreciated that during the periods when the facsimile multiplexing operations are not desired, the terminal CV may be coupled to the network link input for conventional relaying of the television signals from station A in lieu of the coupling of the multiplex system output to the network link input. The outputs of the stabilizing amplifier 31 which are utilized in the facsimile multiplexing operation are the video signal output appearing at terminal V (i. e. the composite video signal clipped at the blanking level), and the stripped (and cleaned-up) sync output appearing at terminal SS.

The video signal output appearing at terminal V is applied via a key-out gate 33 to the output adder 35. The gate 33, which may take a conventional form, is adapted to pass the video signals applied from amplifier 31 at all times except during the periods of application of gate control pulses thereto. The gate control pulses which control gate 33 are in accordance with the invention timed to block passage of signals from amplifier 31 to adder 35 during the vertical blanking intervals of the television signal. The generation and timing control of these pulses will be described subsequently.

The sync signals stripped from the input composite signal in stabilizing amplifier 31 and appearing at output terminal SS is applied to the remote-local sync lock-in apparatus 40, which is adapted to lock a local sync generator 49, as a slave, to the sync of the composite video signal from station A. The lock-in apparatus 40 illustrated in Figure 2 is of the so-called "Genlock" type which is well described in the literature, an explanation thereof in some detail appearing, for example, in the article entitled "The Genlock—a New Tool for Better Programming in Television" by J. H. Roe, in the Proceedings of the National Electronics Conference for 1950. As described in the aforementioned article, the "Genlock" unit combines two separate circuits which serve to provide control signals to the line frequency and field frequency sections, respectively, of the local sync generator. One circuit derives a varying D.-C. error signal from the comparison of a horizontal drive signal from the local sync generator with the separated sync signal derived from the remote picture signal, and this error signal is applied to the reactance tube in the local sync generator to directly control the frequency and phase of its master oscillator. The second circuit derives from the comparison of integrated and clipped local and remote sync signals an error signal in the form of a positive pulse recurring at field frequencies, the error pulse ceasing to exist as soon as the two field frequency signals are coincident. This error signal is applied to a counter circuit in the local sync generator in such a way as to cause a miscount, resulting in the drift of the local field frequency at an accelerated pace until the two signals coincide in phase, the counter circuit thereafter operating normally.

Such a lock-in system is illustrated by the block diagram break-down of lock-in apparatus 40 in Figure 2. In the line frequency control section, the stripped sync from amplifier 31 is applied to a blocking oscillator 41 to control the generation of a line frequency pulse signal. Local horizontal drive signals, derived from the output terminal HD of the local sync generator 49, are applied to a sawtooth generator 42 to control the generation of line frequency sawtooth waves therein. The sawtooth and pulse signals are applied to an AFC discriminator 43 to produce in a well-known manner the variable D.-C. error signal. The error signal output of discriminator 43 is applied to the local sync generator 49 to control its master oscillator frequency. (The local sync generator 49 has not been illustrated in detail, but may, for example, take the form of the RCA TG-1A or TG-10A type sync generators.)

The field frequency control section of lock-in apparatus 40 is illustrated as including circuits 45 and 46 for integrating and clipping the sync signals stripped from the composite video signal of station A and the sync signals generated by the local sync generator 49, respectively. The circuits 45 and 46 are adapted to produce respective well-shaped field frequency pulses of equal amplitude but slightly different width, which are applied to an inverter-mixer circuit 47. As explained in the aforementioned article, the operation of the inverter-mixer circuit 47 is such that the wider pulse tends to produce a negative pulse output signal of large amplitude, while the narrow pulse produces a positive pulse signal of relatively small amplitude. When the two pulses are not coincident, the mixed signal appears as a combination of positive and negative pulses separated in time; however, when the pulses coincide in time, the positive pulse is completely swallowed by the larger and wider negative pulse. The pulse output of circuit 47 is applied to a counter circuit in generator 49, such as the 7:1 counter of the RCA TG-1A or TG-10A generators, which is not responsive to negative pulses; thus, the miscounting ceases as soon as the coincidence occurs and the swallowing of the positive error pulses is achieved.

The result of the operation of the lock-in apparatus 40 above described is a direct tie-in of the remote and local sync signals. It will of course be appreciated that operation of the present invention does not depend upon the use of the particular lock-in system described and illustrated. Use of the correctly timed horizontal and vertical drive signal outputs of sync generator 49, appearing respectively at output terminals HD and VD, in controlling various operations in the multiplexing system shall now be described.

The vertical drive signal output of generator 49 is used to control a multivibrator 51 in the generation of the previously mentioned gate control pulses applied to the key-out gate 33. The multivibrator 51 is adjusted to generate control pulses in response to vertical drive which effectively block the passage of signals from amplifier 31 to output adder 35 during the whole of each vertical blanking interval in the television signal of station A. The vertical drive signal of generator 49 is also applied to a multivibrator 53 to control the generation of another series of gate control pulses. The gate control pulse output of multivibrator 53 is utilized to periodically permit passage of oscillations from an R. F. oscillator 54 through a gate 55 to the output adder 35. The gated R. F. burst effectively replaces the usual vertical synchronizing pulse in providing the field frequency information required to achieve proper interlace, and to indicate the beginning of the facsimile sending period. While the frequency and width of the R. F. burst are not particularly critical, a frequency which is readily distinguishable from the television line frequency and its lower order harmonics, and a width of no greater than a half line duration (whereby the burst may be clear of horizontal sync pulses on both odd and even fields), should be indicated as preferable. Thus, a particular example of operating parameters would be the use of 2.5 mc. as the operating frequency of oscillator 54, and a gate control pulse width for the output of multivibrator 53 of a half line ($\frac{1}{31,500}$ sec.) duration. Timing of the gate control pulse generation by multivibrator 53 may thus, for example, be such as to coincide with the first half line portion of each vertical blanking interval of the composite television signal.

Where a separate horizontal sync output terminal is not available in sync generator 49, an additional multivibrator 57 may be provided which responds to the horizontal drive signal output of generator 49 to produce pulses of timing and width appropriate for their service as horizontal sync pulses in the multiplexed signal to be relayed. Thus, the output of multivibrator 57 is illustrated as being applied to the output adder 35 to recombine horizontal sync with the video signals applied thereto, as well as to insert horizontal sync appropriate to the facsimile signals to be applied to adder 35. The generation of these facsimile signals in the appropriate time intervals available is the subject of the subsequent description.

The facsimile scanning apparatus illustrated in Figure 2 is in general accord with the Ultrafax apparatus disclosed in the aforementioned RCA Review article. Thus, copy which has previously been recorded on photographic film 70 is scanned by a flying light spot generated by a flying spot kinescope 60, and the intensity modulated light passed through the film is converted to a video signal in a light responsive device such as the multiplier phototube 73. The flying spot kinescope may be of conventional type, such as the commercially available type 5WP15, for example. Light emitted from the phosphor screen 61 of the kinescope 60 passes through an objective lens system 69, where it is focused on the film 70. The modulated light passed through the film is then focused on the multiplier photo-tube 73, which may for example be of the RCA 931-A type, by a condenser lens system 71.

While the Ultrafax system disclosed in the aforementioned RCA Review article utilizes continuous film motion, it will be appreciated that this is not particularly appropriate for the inherently intermittent facsimile scanning operations required in the present system. Therefore, the facsimile scanning apparatus of Figure 2 differs from the Ultrafax system of the aforementioned article in utilizing an intermittent film advance system. Since, as previously noted, active scanning of the copy in the facsimile apparatus takes place only during the vertical blanking intervals of the composite television signal, it will be appreciated that operating conditions are well suited for intermittent film movement. That is, the full video interval of the composite television signal is available for advancement of film, this interval representing between 92% and 95% of a standard $\frac{1}{60}$ of a second television field period. Thus, in contrast with the usual television film scanning operations, where only the vertical blanking interval is available for film advancement and the entire video interval is required for scanning, the operating requirements for the intermittent film projection apparatus of the facsimile system of Figure 2 are relatively simple to satisfy.

Figure 3:
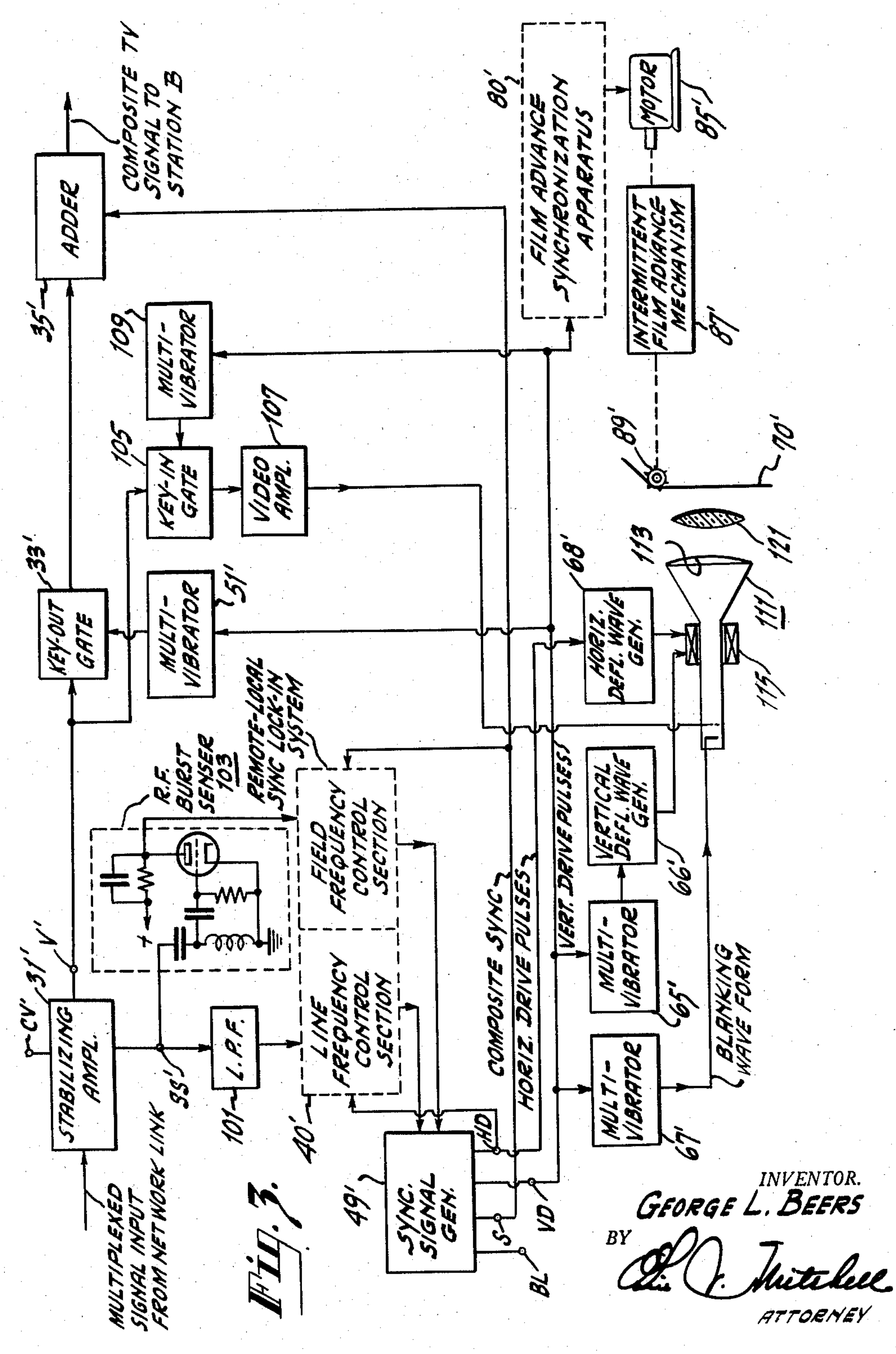
Figure 3 illustrates in block and schematic form receiving terminal apparatus of a television-facsimile multiplexing system in accordance with an embodiment of the present invention.

Several arrangements for relating film advancement to raster development in the facsimile scanning operations have been contemplated. In the arrangement appropriate to the system as illustrated in Figure 3, the film is advanced incrementally after each active facsimile scanning period. For example, the film may be advanced $\frac{1}{30}$ of a film frame after each vertical blanking interval of the composite television signal. An advantage to the use of the incremental advance after each scanning period is that a similarly located scanning raster on kinescope screen 61 may be used during each of the abbreviated facsimile scanning periods to illuminate the successive film frame segments. It will be appreciated, however, that a feasible alternative to this type of operation would be an arrangement in which the film is advanced a full film frame only after the completion of the scanning of an entire film frame. Such a method of operation can be carried out, for example, if the scanning raster developed on kinescope screen 61 is shifted an appropriate distance between each vertical blanking interval so that adjacent segments of the stationary film frame are scanned in proper sequence. It may also be noted that a variation of the first (incremental advance) method is also feasible, in which the film is advanced an appropriate fraction of a film frame length only after every other facsimile scanning interval, so as to provide an interlaced scanning of each successive film frame segment.

In Figure 2, a sprocket wheel 89 is schematically illustrated as providing the required film propulsion, the sprocket wheel 89 being driven intermittently by an intermittent film advance mechanism 87, in turn driven by a motor 85. Intermittent film drive systems are well-known in the art, and the mechanical details thereof have therefore not been specifically illustrated. The intermittent mechanism 89, which may for example take the form of a well-known Geneva movement, is adjusted to periodically impart an advancing motion to the film, of a distance which is a predetermined fraction of the length of a full film frame (such as the previously mentioned 1/30 of a film frame length, for example).

The actual fractional length of a film frame which shall constitute the periodic advancement imparted to the film will depend upon the desired resolution of the facsimile reproduction (i. e. the desired number of scanning lines per frame), and the number of scanning line periods in the composite television signal's vertical blanking interval which are to be devoted to facsimile information. In accordance with FCC broadcast standards the duration of a vertical blanking interval may be between the limits of 13 and 21 line periods. Assuming, for example, that the vertical blanking interval duration in the composite television signal transmitted by station A is sufficiently long to permit the use of 16 line periods for active scanning of the facsimile copy, a film advancement of the aforementioned example, 1/30 of the film frame length, will provide a facsimile reproduction having a vertical resolution of 480 lines per film frame, comparable to the vertical resolution normally attained in television image reproduction. It will be appreciated that these figures are given by way of example only, and other combinations of incremental film frame advancement and lines per scanning period are readily possible.

It will be readily recognized that to insure that the film advancement takes place during the relatively long periods intervening the actual facsimile scanning periods, it is necessary that the film advance apparatus be synchronized with the composite television signal, with which the facsimile signals are to be multiplexed. As an example of equipment suitable for this purpose, film advance synchronization apparatus 80 of a well-known type has been illustrated in Figure 2. The synchronization apparatus 80 may simply comprise a multivibrator 81 which responds to vertical drive pulses from the sync generator 49 and which converts the assymmetrical pulse input thereto to a synchronous square wave output. The square wave output of multivibrator 81 is applied to a low pass filter 82 which is adapted to remove the high frequency components of the square wave and provide a substantially sinusoidal output corresponding to the fundamental frequency of the square wave input. The synchronous sine wave output of low pass filter 82 is amplified in a power amplifier 83 and applied to energize the motor 85 which drives the intermittent film advancing mechanism 87. While other synchronization schemes are readily possible, the illustrated apparatus is considered particularly appropriate for the present purposes in which the film advance power requirements are relatively small (i. e. the distance of each periodic advancement being relatively small, and a relatively long time period being available for imparting this motion).

The development of the desired scanning raster on the kinescope screen 61 in the proper location at the proper time may be achieved relatively simply where, as described, the film is advanced incrementally after each scanning period. The horizontal scanning waves applied to the deflection yoke 63 of the kinescope 60 are developed in conventional horizontal deflection circuits 68 under the synchronous control of horizontal drive pulses from the sync generator 49. Similarly the vertical scanning waves applied to yoke 63 may be developed in conventional vertical deflection circuits 66 under the synchronous control of vertical drive pulses from sync generator 49. However, to insure that the retrace period of the vertical scanning wave developed by deflection circuit 66 has ended before the desired starting period for actively scanning the facsimile copy, the deflection circuits are controlled by fixed vertical pulses derived from a multivibrator 65 responsive to the vertical drive output of sync generator 49. To insure that the facsimile copy is illuminated by light from the kinescope screen 61 only during the predetermined segment of the vertical blanking interval assigned to facsimile scanning, a blanking waveform is applied to the electron gun of kinescope 60 to cut off the scanning beam during the entire time period intervening the assigned scanning periods. This blanking waveform is generated by a multivibrator 67, synchronously controlled by the vertical drive output of sync generator 49.

The video signals developed in photo-tube 73 in response to the impingement of the flying light spot passed through film 70 are amplified in a video amplifier 75 applied to the output adder 35. The multiplex signal output of adder 35 which comprises the video signal portion of the composite television signal sent out by station A, the replaced horizontal synchronizing pulses provided by multivibrator 57, the gated R. F. burst periodically passed by gate 55 and the facsimile video signals periodically appearing in the output of video amplifier 75 is applied to the input end of the network link which is to convey the multiplexed signal to remote receiving terminal.

Figure 3 illustrates a representative form which the output terminal apparatus 23 of Figure 1 may take in accordance with an embodiment of the present invention. The multiplexed television-fascimile signal conveyed by the network link 19 as it is received at the output end thereof is applied to a stabilizing amplifier 31', which may be similar in structure and general function to the stabilizing amplifier 31 of Figure 2, previously discussed. Again, the output terminals V' and SS', to which separated video signals and strip synchronizing signals are available respectively, are utilized for the purposes of the multiplex system. The composite signal output available at terminal CV' is not utilized in the multiplex operations, but may be utilized for supplying television signals to station B, when the facsimile information does not accompany the related television signals. The stripped synchronizing signals appearing at terminal SS' are again applied to a remote-local sync locking system 40', which may be of the same Genlock type discussed with relation to the lock-in apparatus 40 of Figure 2. However, in view of the fact that the composite multiplexed signal received from the network length differs from the composite signal that was applied to stabilizing amplifier 31 in the terminal apparatus of Figure 2 in that the usual serrated vertical sync pulses are absent and an R. F. burst is present, the synchronizing signals at terminal SS' are not applied directly to the lock-in apparatus 40'. Rather, a first signal path including an R. F. burst senser 103 is provided for application of synchronizing information to the input terminal of the field frequency control section of the lock-in apparatus 40'. The senser 103 is adapted to selectively respond to the frequency of the synchronizing burst inserted at the input end of the network link to produce a suitable field frequency control pulse, which may be compared with locally generated vertical sync pulses from the sync generator 49' to generate error information suitable for locking the generator 49' to the received composite signal.

A second signal path, including a low pass filter 101, is provided for application of the stripped synchronizing signals to an input terminal of the line frequency control section of the lock-in apparatus 40'. The operation of the line frequency control section of the apparatus 40' in tieing the generator 49' to the received composite signal at line frequency is identical with the similar operation previously described with respect to Figure 2, the low pass generator 101 in the input path of the remote signal to this section merely serving to prevent response of this section to the synchronizing R. F. burst. The result of the operation of the lock-in apparatus 40′ as above described is a direct tie-in of the local sync generator and its respective output signals with the received composite signal.

The separated filter signal output appearing at terminal V′ of amplifier 31′ is applied to a key-out gate 33′, which serves a purpose similar to that of the key-out gate 33 of Figure 2. That is, the gate 33′ serves to block passage of video signals from amplifier 31′ to an adder 35′ during the "vertical blanking intervals" of the received composite signal, and to permit passage thereof during the intervening signal periods. As previously, appropriately timed gate control pulses for gate 33′ may be provided by a multivibrator 53′ suitably responsive to the vertical drive output of sync generator 49′.

The signals appearing at terminal V′ are also applied to an additional key-in gate 105, which has a gating function which is the reverse of the function of gate 33′. The key-in gate 105 is adapted to permit passage of signals from amplifier 31′ to a video amplifier 107 during the "vertical blanking intervals" of the received composite signal, and to block the passage thereof during the intervening signal periods. Suitably timed gate control pulses for the key-in gate 105 may be developed by a multivibrator 109 in response to the vertical drive output of generator 49′. The width of the gate-opening pulse may preferably be somewhat less than the full width of the vertical blanking interval so that information is passed to the video amplifier 107 only during the actual presence of facsimile signals. However, if the recording kinescope 111, by which the facsimile signals are to be displayed, receives a properly timed blanking waveform, such restriction on the control pulse width for gate 105 is not essential, and the gate control pulse output of multivibrator 53′ may be used, eliminating the necessity for multivibrator 108.

The development of a scanning raster on the screen 113 of kinescope 111 may again be achieved with conventional equipment: deflection yoke 115, and horizontal and vertical deflection circuits 117 and 119, latter being under the synchronous control of horizontal and vertical drive pulses, respectively, from generator 49′. As in the system of Figure 2, a multivibrator 65′ may be interposed in the vertical drive circuit to insure that the retrace period of the vertical scanning wave has ended before the beginning of the facsimile scanning period. Multivibrator 67′ develops, in response to vertical drive pulses from generator 49′, blanking waveform for application to the electron gun of kinescope 111 to cut off the scanning beam except during each period of application of facsimile signals to a suitable beam intensity control electrode thereof.

Light from the abbreviated scanning raster developed on screen 113 during the facsimile presentation period is imaged by a lens system 121 upon the unexposed film 70′. The advancement of the unexposed film 70′ in this recording operation is achieved intermittently during the relatively long periods intervening the times of actual facsimile scanning. The apparatus used for achieving this intermittent motion at the predetermined incremental rate may be a duplicate of that previously described for the sending terminal apparatus, such as apparatus including sprocket wheel 89′, the intermittent film advance mechanism 87′ and the driving motor 85′. Proper synchronization of the film advancement may be achieved again through use of film advance synchronization apparatus 85′ of the type previously described, which responds to vertical drive pulses from the sync generator 49′.

The adder 35′ to which the signals passed by key-out gate 33′ are applied also receives the composite sync signal output, available at terminal S of generator 49′. The output of adder 35′ thus comprises a composite television signal, from which all traces of the previously accompanying facsimile signals have been removed, and which is in suitable form for application to the receiving television station B. It will thus be appreciated that the facsimile copies obtained from the recording operations on film 70′ are available at the receiving end of the end of the network link after what may be considered a "free ride" on the composite television signal being transferred.

There has thus been described a novel multiplexing system whereby facsimile signals may be conveyed to a remote point simultaneously with the conveyance of composite television signals. This simultaneous conveyance is achieved without in any way interfering with the required information content of the television signals, the facsimile signals being inserted into the composite signal being relayed during the vertical blanking intervals which represent essentially "wasted" time periods in the network transfer of television signals. The present invention is thus believed to render the use of wide band facsimile relays between remote points economically feasible, since available television network facilities may be used for the transfer of the wide band facsimile signals simultaneously with their normal use for transfer of network television programs.

It will be appreciated that the present invention is not limited to the use of the specific equipment illustrated in the drawings and discussed in the preceding description. The illustrative embodiments thus presented demonstrate that the present invention may be readily practiced using well-known equipment and techniques. However, various simplifications and improvements may be made in the specifically illustrated systems without departing from the scope of the present invention. It may be noted, for example, that the use of the lock-in apparatus 40 to "slave" the sync generator 49 in the sending terminal apparatus illustrated in Figure 2, as well as other illustrated details of the multiplexing system, may not be necessary if the facsimile scanning and multiplexing equipment are directly located at station A. That is, if the facsimile scanning and multiplexing equipment are located at a point where the outputs of the station's sync generator, which is used to supply sync signals to the composite signals to be relayed, are available for controlling use, the lock-in of another sync generator is not needed to obtain properly timed controlling signals. The invention has been illustrated in the form of Figure 2, however, since it is believed more likely that in actual use of the principles of the present invention the facsimile scanning and multiplexing systems would preferably be centrally located at the terminal facilities of a network system rather than at each television station which might contribute program material to the network system.

It should of course be appreciated that, while reference has been made, in the previous description of embodiments of the present invention, to the use of copy in the form of film, the principles of the present invention are also applicable to facsimile operations where the copy takes some other form as appropriate to the use of other copy-reproducing methods not involving photographic principles.

Having thus described my invention, what is claimed is:

1. In a system for relaying composite television signals including synchronizing and blanking information occurring during periodically recurring vertical blanking periods, the combination comprising high speed facsimile scanning apparatus for generating copy-representative video signals, means for synchronizing the operation of said fascimile scanning apparatus with the composite television signal being relayed such that said copy-representative video signals are generated only during a predetermined portion of each of said recurring vertical blanking periods, means for stripping the synchronizing and blanking information normally occupying said vertical blanking period portions from said composite television signal, and means for replacing, in said composite television signal, the stripped information with said copy-representative video signals.

2. In a television signalling system, the combination comprising means for generating a composite television signal having periodic vertical blanking intervals, said composite television signal comprising respective sync and video signal components, facsimile scanning apparatus for generating relatively wide band facsimile signals, means for controlling the operation of said facsimile scanning apparatus in accordance with said composite television signal such that the generation of said facsimile signals occurs only during the vertical blanking intervals of said composite television signal, means for separating said composite television signal into sync and video signal components, and means for combining said video signal component with said periodically generated facsimile signals.

3. In a system for relaying composite television signals, said system including a relay link having an input terminal and an output terminal, the combination comprising means for periodically generating facsimile signals, means for stripping from said composite television signal the information appearing therein during said periods of facsimile signal generation, means for combining said facsimile signals with the remaining portions of said composite television signal, and means for applying the combined signal to the input terminal of said relay link, said composite television signals including periodically recurring vertical blanking intervals, and the periods of facsimile signal generation occurring only during said vertical blanking intervals.

4. Apparatus in accordance with claim 3 including means coupled to the output terminal of said relay link for separating said combined facsimile and television signals, and respective facsimile and television signal utilization apparatus coupled to said separating means and responsive to the respective separated signals.

5. Apparatus in accordance with claim 4 including means for periodically generating a burst of relatively high frequency oscillations, and means for applying said burst to said signal combining means.

6. Apparatus in accordance with claim 5 including a sync signal generator having field and line control outputs, means responsive to said bursts and effectively coupled to said output terminal for synchronously controlling the field control output of said sync signal generator, and means for rendering said signal separating means and said facsimile and television signal utilization apparatus responsive to the outputs of said sync signal generator.

7. In a signalling system provided with a composite television signal input including periodically recurring vertical blanking intervals, the combination comprising relatively high speed facsmile scanning apparatus including intermittent copy advancing apparatus, flying light spot generating means for scanning said intermittently advanced copy, and means responsive to said flying light spot as modulated by said scanned copy for generating relatively wide band facsimile signals; means for limiting the generation of said flying light spot to a predetermined segment of each of said periodically recurring vertical blanking intervals; means for replacing the signals normally occupying the vertical blanking intervals of said composite television signal with said wide band facsimile signals; remote television signal utilization apparatus; and means for relaying the output of said signal combining means to said remote utilization apparatus.

8. Apparatus in accordance with claim 7 wherein said intermittent copy advancement apparatus is synchronized with said composite television signals whereby said copy advancement occurs only during periods intervening said recurring vertical blanking intervals.

9. Apparatus in accordance with claim 8 wherein said flying light spot generating means comprises a kinescope including electron beam generating means, and wherein the means for limiting the generation of said flying light spot to said predetermined periods comprises blanking waveform applying apparatus coupled to said beam generating means and synchronized with said composite television signal.

10. Apparatus in accordance with claim 9 including remote facsimile signal utilization apparatus, and means for separating said combined facsimile and television signals, said signal separating means being coupled between said relaying means and said remote facsimile and television signal utilization apparatus.

11. Apparatus in accordance with claim 10 wherein said remote facsimile signal utilization apparatus includes cathode ray tube means for displaying said periodically generated facsimile signals, means for imaging said facsimile signal displays on a recording film, means for intermittently advancing said recording film, and means for synchronizing said intermittent film advancing means with the relayed signals whereby said film advancement occurs only during periods intervening the intervals of presence of said facsimile signals in said combined signal.

12. In a television signalling system, the combination comprising means for generating a composite television signal including blanking information occurring during periodically recurring vertical blanking intervals, apparatus for generating signals representative of auxiliary information, means for controlling the operation of said auxiliary information signal generating apparatus in accordance with said composite television signal such that the generation of said auxiliary information signals occurs only during a predetermined portion of each vertical blanking interval of said composite television signal, and means for substituting, in said composite television signal, said auxiliary information signals for the blanking information normally occupying said vertical blanking interval portions.

References Cited in the file of this patent

UNITED STATES PATENTS

| | | |
|---|---|---|
| 2,073,370 | Goldsmith et al. | Mar. 9, 1937 |
| 2,211,926 | Goldmark | Aug. 20, 1940 |
| 2,527,967 | Schrader | Oct. 31, 1950 |
| 2,550,821 | Kharbanda | May 1, 1951 |
| 2,613,263 | Hilburn | Oct. 7, 1952 |
| 2,613,264 | Haynes | Oct. 7, 1952 |
| 2,625,602 | Somers | Jan. 13, 1953 |
| 2,664,462 | Bedford | Dec. 29, 1953 |
| 2,686,220 | Sziklai et al. | Aug. 10, 1954 |
| 2,696,523 | Theile | Dec. 7, 1954 |